May 8, 1956 P. BAKKER 2,744,962

SWITCHING SELECTOR REPEATER

Filed Jan. 6, 1955 3 Sheets-Sheet 1

*INVENTOR.*
PIER BAKKER
*BY* [signature]
ATTY.

May 8, 1956 P. BAKKER 2,744,962

SWITCHING SELECTOR REPEATER

Filed Jan. 6, 1955 3 Sheets-Sheet 2

INVENTOR.
PIER BAKKER
BY [signature]
ATTY.

INVENTOR.
PIER BAKKER
BY Wm. Walter Owen.
ATTY.

United States Patent Office 2,744,962

Patented May 8, 1956

2,744,962

SWITCHING SELECTOR REPEATER

Pier Bakker, Chicago, Ill., assignor to Automatic Electric Laboratories, Inc., Chicago, Ill., a corporation of Delaware Application January 6, 1955, Serial No. 480,190

11 Claims. (Cl. 179—18)

The present invention relates in general to automatic telephone systems and more particularly to switching selector repeaters for use therein.

With the growth of automatic switching systems in the communications field, the eventual necessity of universal numbering schemes especially for heavily populated areas was early recognized and various attempts were made for solving the problems to make such schemes economically feasible. Each area had its own particular problems; and solutions, which were advantageous for one area, were not always suitable for other areas.

In many areas there grew, due to various growth patterns and economic problems, telephone systems having several interconnected main offices each of which had smaller exchanges subsidiary to them. It was often found advantageous, if not imperative, to assign one or more of the initial digits of subscriber numbers at a main office for initial digits in subscriber numbers at its respective suboffice or suboffices. It soon became apparent that such systems would require universal numbering if a good grade of service were to be provided at a reasonable cost to the customer. It is with this type of a system that the present invention is concerned.

Very early in the art, it was found advantageous to install special equipment in the first switching stage of the suboffice, such equipment providing for the simultaneous transmission of certain initially dialed digits to the main exchange and absorption of said digits by the first switching stage at the suboffice. In response to subsequent digits received, said special equipment, commonly referred to as switching selector repeaters, then distinguished between local calls and calls to the main exchange and accordingly established connections to the proper destination, disconnecting the local or main exchange connections depending upon the location of the called subscriber. In this way, it was not necessary to route a local suboffice call by way of the main exchange equipment.

One early development is disclosed in the United States Patent No. 1,542,958 issued June 23, 1925, to Ray. This disclosure shows the use of an extra control wiper and marked bank contacts accessible thereto for providing for the absorption of initial digits. This method has the important advantage of reduced wear on the switching selector repeater; for example, the switch does not drop back on the first digit when it has not yet been determined whether the call is local or to the main office.

It is an object of the invention proposed herein to provide an arrangement somewhat similar to that shown in said patent but having greater simplicity and flexibility. The applicant has utilized normal post springs together with new circuits in combination with marked extra control banks for achieving the necessary control functions in the selector repeater. The marked extra control banks are critical in response to second digits while the normal post springs are critical in response to first and third digits.

Several advantages are gained by the combination of normal post springs and marked extra control banks as utilized in the present invention:

1. Provision is made for switching through connections in response to a first digit—e. g. "0" to reach the operator.
2. A more efficient use of numbers available for main office directory numbers is obtained—e. g. all numerals 1–0 are available as second digits of main office directory numbers.
3. The need for special wiring of the extra control banks is eliminated for all circumstances.
4. Provision is made for switching through connections in response to a fourth digit after the third digit has determined that the call is local and has caused the wipers to return to normal.

A feature is the economy which is gained because all the extra control banks of the switching selector repeaters in a shelf can be multipled. Because the switching selector repeaters will properly complete their functions (as described in more detail later) even though three or four of them simultaneously test for resistance ground potential on the extra control banks, it will be possible in small exchanges—having, for example, only ten such switches in a shelf—to multiple all extra control contacts in each switch, to which the same potential is to be connected, in addition to multipling the extra control banks of all the switches.

Another feature is the means effective after the first three digits have determined that a local subscriber is being called for switching through connections in response to the last of said three digits or in response to a fourth digit, dependent upon which of two optional wiring schemes is used.

The applicant achieves another advantage by using the combination of normal post springs and extra control contacts. In the above-mentioned patent to Ray, the marking of the extra control contacts is used to determine whether a third digit (as well as the second digit) is part of a local number or a main office number. Therefore, after the wipers have been stepped vertically in response to the third digit, the rotary magnet of the switching selector repeater must be operated at least once to move the wipers to the first bank contacts. Then a test must be made over the extra control wiper to prevent further rotary movement of the wipers if the marking on the extra control contact indicates that the call is to the main office. By using normal post springs for this purpose, no such test is necessary; and no rotary movement of the wipers is necessary if the call is to the main office.

Other features will be evident upon a perusal of the following description in which.

Figure 5:
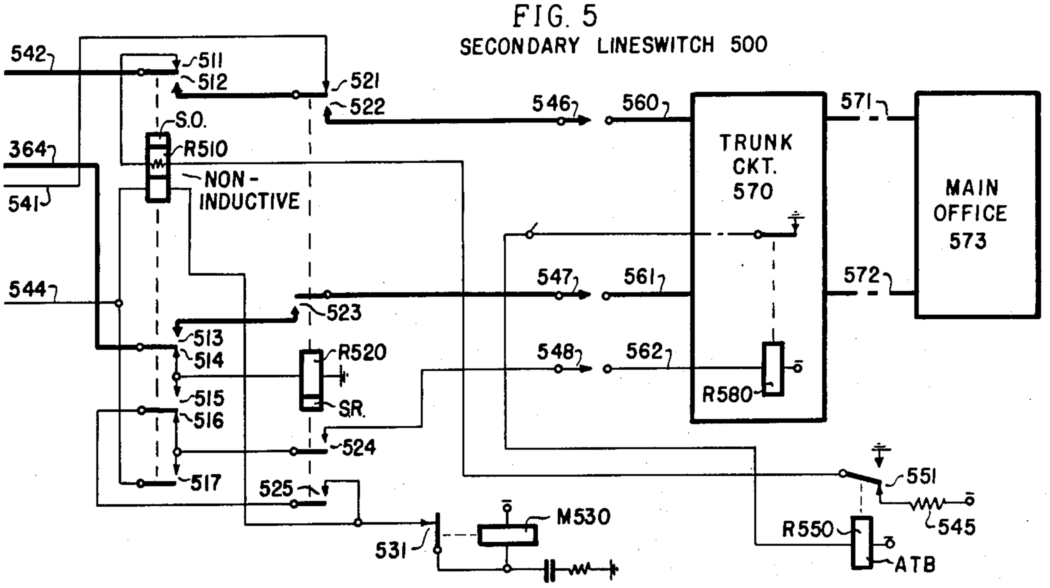
Figure 4:
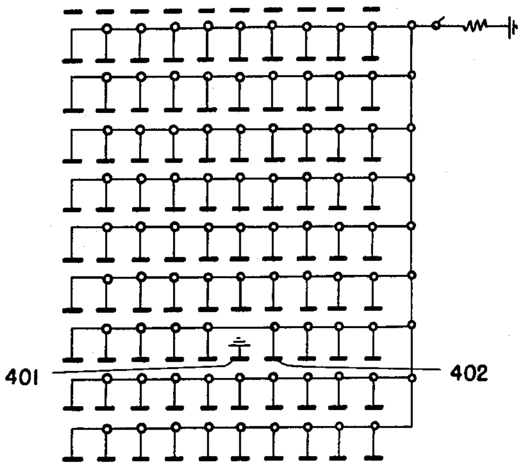
Fig. 4 shows the wiring of the extra control bank contacts of the selector repeater; and, Fig. 5 shows a secondary lineswitch individual to the selector repeater and shows, in block diagram, a main office and a trunk extending from said lineswitch to said main office.
Figure 1:
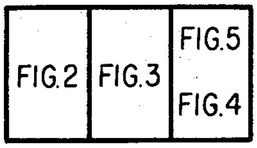
Fig. 1 shows in block diagram the arrangement of Figs. 2–5.
Figure 2:
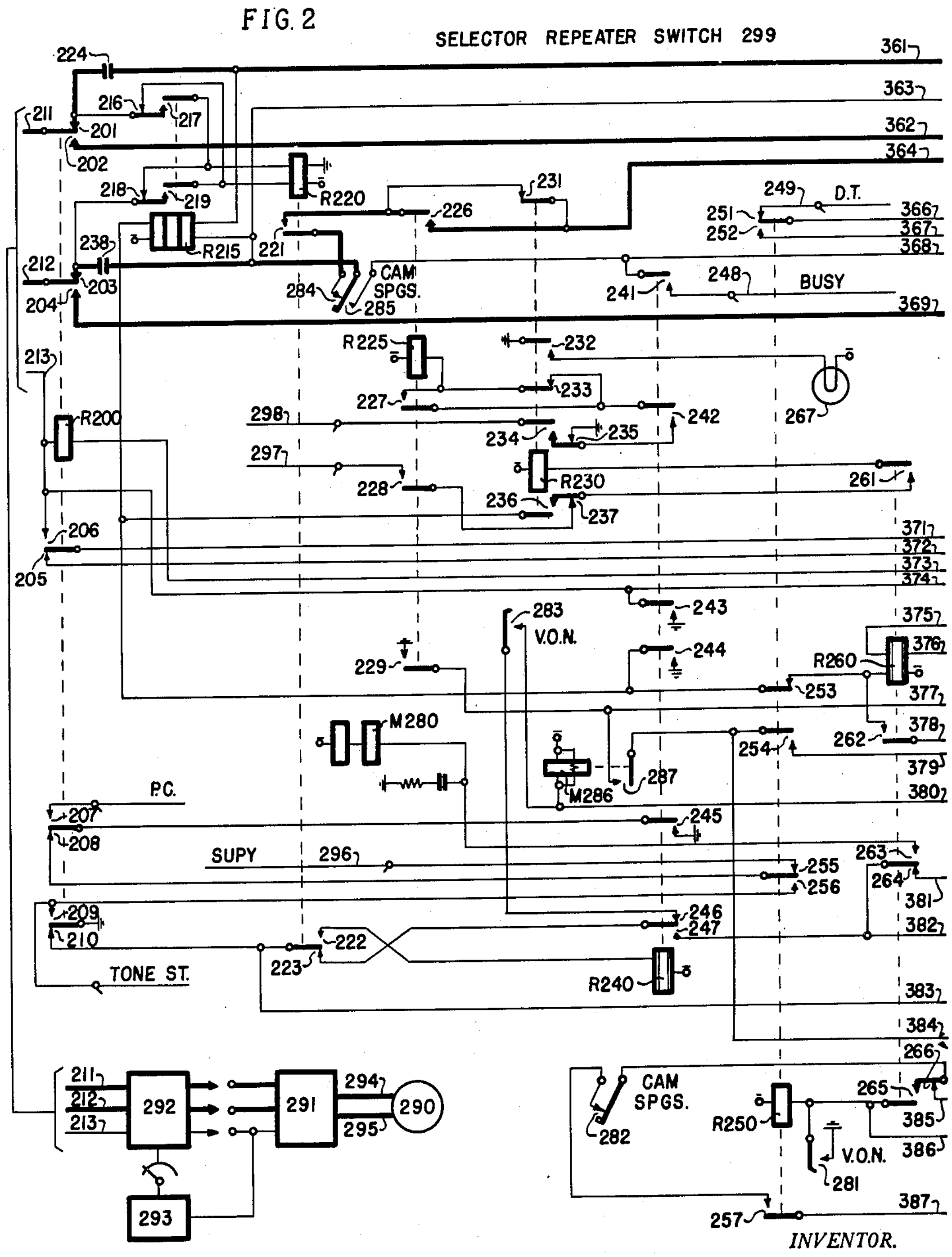
Figs. 2 and 3 show the selector repeater in detail.
Figure 3:
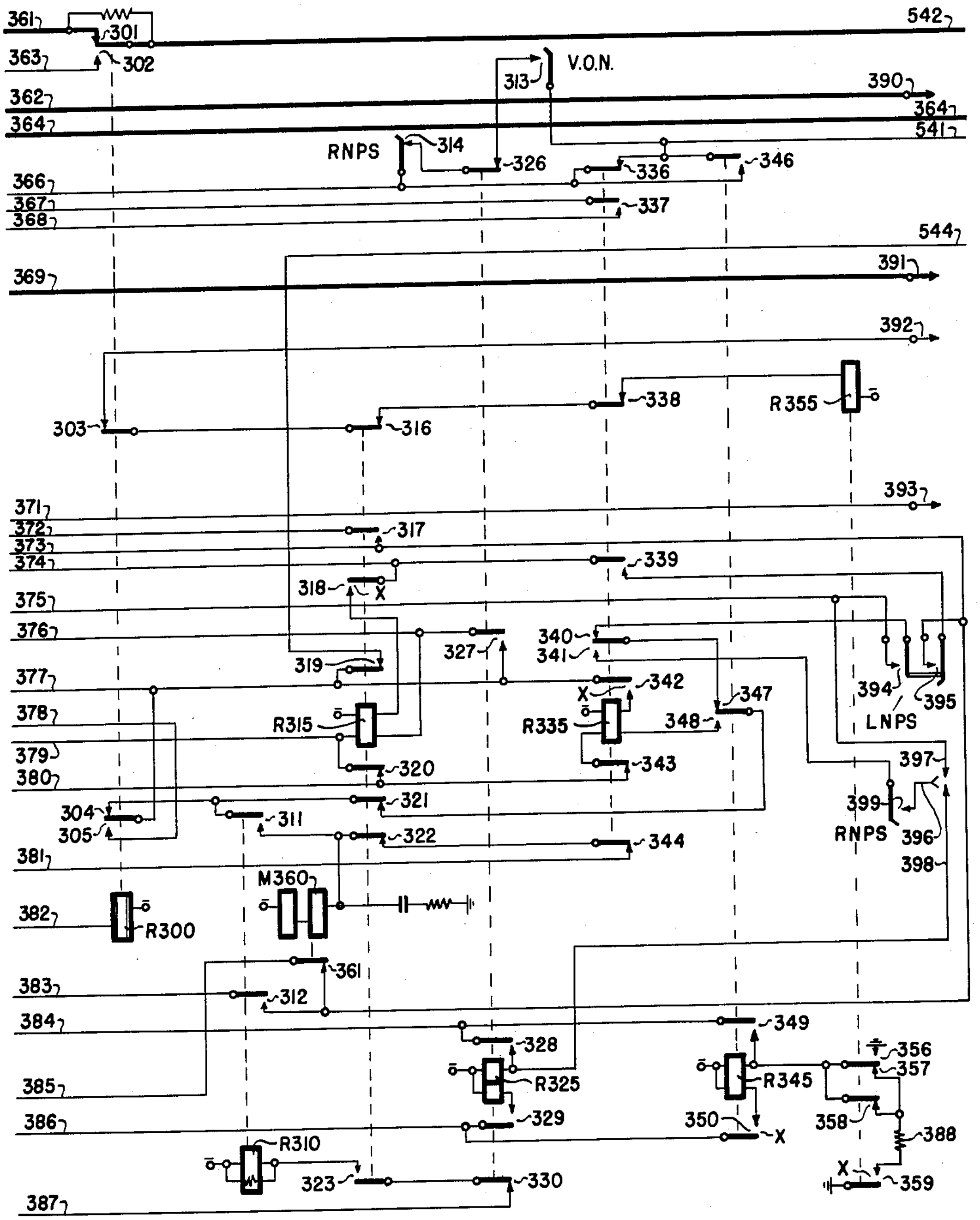

The preferred embodiment shows a two-motion vertical and rotary step by step selector repeater switch and a single motion rotary lineswitch connected thereto. When a calling subscriber in a suboffice is connected to the selector repeater, he is also connected to switching equipment in the main office by way of the lineswitch.

The first digit dialed by the subscriber is repeated to selectively operate the switching equipment at the main office; and said digit causes the wipers of the selector repeater to be raised to a desired vertical level. If the left normal post springs operate in said desired level, the selector repeater will search for and seize an idle outlet in said desired level and connections to the main office will be released. However, if said left normal post springs do not operate in said desired level, the wipers are held in said vertical position until a second digit causes the wipers to be rotated to a desired rotary position in said desired level. Said second digit is also repeated to the main office to selectively operate switching equipment therein.

If the extra control wiper finds resistance ground potential connected to the contact it engages in said desired rotary position, the wipers of the selector repeater are rendered ineffective and the call is completed by way of the main office in a normal manner.

If the extra control wiper finds direct ground potential connected to the contact it engages in said desired rotary position, the wipers of the selector repeater are restored to normal and the third digit dialed by the subscriber will determine whether the call is local or to the main office.

After the second digit has restored the wipers of the selector repeater, the third digit dialed by the subscriber will be repeated to the main office to selectively operate switching equipment therein and will cause the wipers of the selector repeater to be raised to a desired level. If the right normal post springs do not operate in this latter desired level, the wipers of the selector repeater are rendered ineffective; and the call is completed by way of the main office in the normal manner. However, if the right normal post springs do operate in said latter desired level, they operate means whereby the call is established locally in either of two ways depending upon which of two wiring schemes is used and whereby connections to the main office are released. If one of said wiring schemes is used, the wipers of the selector repeater will be rotated over said latter desired level to search for and seize an idle outlet in the normal manner. If the other wiring scheme is used, the right normal post springs will operate means for causing the wipers to be restored to normal a second time; then, in response to a fourth digit, the wipers will be raised to a desired level then rotated into said level to search for and seize an idle outlet in the normal manner.

*Seizure of switching selector repeater 299*

Assume that the subscriber at substation 290 desires to call the local operator and that the operator can be reached over the 0 level of selector repeater switch 299. When the handset is removed from the cradle at substation 290, the subscriber will be connected to switch 299 in a manner well known in the art by way of the line conductors 294 and 295, line circuit 291, and the finder 292 under control of allotter 293. The line relay R220 will be operated over a circuit comprising battery through the lower winding of R220, contacts 216 and 201, conductor 211, finder 292, line circuit 291, conductor 294, substation 290, conductor 295, line circuit 291, finder 292, conductor 212, contacts 203 and 218 through the upper winding of R220 to ground. At contacts 221, R220 completes connections to the secondary lineswitch 500; at contacts 222, R220 completes an obvious circuit for operating the hold relay R240. At contacts 242, R240 completes an obvious circuit for operating relay R225; at contacts 243, grounds the private conductor 213; at contacts 244, completes obvious circuits for operating the changeover relay R260 and for energizing the left winding of the shunt field relay R215, but R215 does not operate except when both windings are energized in the same direction as is well known in the art; at contacts 245, completes an obvious circuit for extending ground to the supervisory lead 296 for supervisory purposes well known in the art; and, at contacts 247, partially prepares a circuit for operating the vertical magnet M280.

When R260 and R225 operate, they connect the "permanent signal" timing relay R230 to conductor 297 by way of contacts 261 and 228 respectively. Relays R225 and R230 function in a manner well known in the art to release outgoing connections to the main office if the subscriber delays too long before dialing or if a fault occurs on the line so that a conducting path is permanently established across conductors 294 and 295. Briefly, ground potential is momentarily established on conductor 297 periodically by timing equipment (not shown) and R230 will be operated. At contacts 235 and 234, R230 respectively opens the original operating circuit of R225 and connects R225 to conductor 298 by way of contacts 227, 242 and 234. At this moment, ground potential is connected to conductor 298 so that R225 remains operated. After a predetermined time interval, the timing equipment will remove ground potential from conductor 298; and R225 will restore to open connections to the secondary lineswitch 500 at contacts 226 and, due to R230 lighting an alarm lamp 267 at contacts 232, the fault will be found and corrected; however, if the subscriber dials the first digit and if the changeover relay R260 restores subsequent to the termination of said first digit in a manner to be described below, all before R225 restores, then relay R230 will be restored at contacts 261 and the original operating circuit of R225 will be recompleted.

When R260 operates as described above, it prepares at contacts 262 a locking circuit for itself; at contacts 263, further prepares the above-mentioned circuit for operating the vertical magnet M280; and, at contacts 265, prepares a circuit for the stepping relay R310.

When, as described above, the line relay R220 operated contacts 221 to extend connections to the secondary lineswitch 500, the line relay R520 of the lineswitch operated over a circuit extending from ground through the winding of R520, contacts 514, conductor 364, contacts 231, 221 and 284, through the right hand winding of the shunt field relay R215, conductor 361, contacts 301, conductor 542, contacts 511, the upper non-inductive winding of the switching relay R510 through the normally operated contacts 551 of the all trunks busy relay R550 and through resistance 545 to battery. The shunt field relay R215 will not operate because its two windings are energized with their magnetic fields aiding, and R510 will not operate over its upper non-inductive winding.

As is well known in the art, the all trunks busy relay R550 will remain operated as long as one of the trunks extending to the main office 573 and accessible to lineswitch 500 is idle. At contacts 522, 523 and 524, R520 extends partial connections to wipers 546, 547 and 548. At contacts 524 and 525, R520 connects the rotary magnet M530 to the private wiper 548 by way of contacts 531, 525, 516 and 524. If the trunk upon which the lineswitch 500 is standing is idle, battery potential will be connected to its private contact; but, if the trunk is busy, ground potential will be connected to the private contact—e. g. when trunk circuit 570 is seized by a lineswitch other than lineswitch 500, said other lineswitch and its selector repeater extend ground to the private bank contact to which relay R580 is connected to operate R580 and to mark trunk circuit 570 busy. Therefore, if the private wiper 548 engages the private contact of a busy trunk, ground potential will be extended back over wiper 548 and contacts 524, 515, 525 and 531 to the winding of the magnet M530 to energize said magnet. At contacts 531, M530 will open its operating circuit and restore. Upon the restoration of magnet M530 the wipers 546, 547 and 548 will be advanced to the contacts of the next trunk. In this manner, the secondary lineswitch 500 will search for an idle trunk. When the line relay R520 operated contacts 524 and 525 to extend ground potential from the private contact of a busy trunk to the magnet M530, it also short circuited the lower (operating) winding of R510 to prevent the operation of R510. When an idle trunk is found, the lower winding of R510 will no longer be short circuited; and R510 will operate over a circuit comprising battery through the winding of M530, contacts 531, the lower winding of R510, conductor 544, contacts 319, conductor 377 and ground potential on contacts 229. The magnet M530 does not operate in this circuit due to the high resistance winding of R510. The idle trunk circuit relay, corresponding to R580 will be operated by R510 over a circuit extending from ground, over contacts 229, conductor 377, contacts 319, conductor 544, contacts 517 and 524, wiper 548 and a conductor corresponding to conductor 562 to said trunk circuit relay. When R510 operates over its lower winding as described above, it closes contacts 512, 513 and 517 to extend connections from the switching selector repeater 299 to the idle outgoing trunk by way of contacts 522, 523 and 524 and wipers 546, 547 and 548. At contacts 515, R520 locks itself operated in series with M530 over an obvious circuit. In a manner well known in the art, an incoming first selector in the main office 573 is seized.

The seized first selector in the main office will return dial tone in a manner well known in the art to the calling subscriber by way of the negative conductor 560, wiper 546, contacts 522 and 512, conductor 542, contacts 301, conductor 361, capacitor 224, contacts 201, conductor 211, finder 292, line circuit 291, conductor 294, substation 290, conductor 295, line circuit 291, finder 292, conductor 212, contacts 203 and 218, to ground on the upper winding of R220.

The switching selector repeater 299 and the seized first selector in the main office 573 are now ready to receive a first series of impulses from the calling substation 290.

It will be noted that R510 is a slow to operate relay; and, therefore, it cannot operate to switch through connections before the line relay R520 operates. It is necessary that R520 operate first to test for the idle or busy condition of the trunk to which the wipers are connected.

It may be well to mention that busy tone will not be returned at this time to the calling subscriber at station 290 in case that all trunks to the main office are busy because it has not yet been determined whether the call is local or to the main office. If all trunks are busy, relay R550 will have been restored to open contacts 551, thereby to prevent the operation of the line relay R520 when the secondary switch 500 is seized as described above. However, relay R510 will operate over the circuit described above. Certain second and certain third digits determine that a call is to the main office. As will be described below, the contacts of relays R220, R225, R240, R250, R335, R345 and R510 will be in their operated positions at the end of a second digit which has determined that the call is to the main office; and said relays will extend busy tone from equipment (not shown) to the calling subscriber at the end of said second digit by way of conductor 248, contacts 241, conductor 368, contacts 337, conductor 367, contacts 252, conductor 366, contacts 346, conductor 541, contacts 521 and 512, conductor 542, contacts 301, conductor 361, capacitor 224, contacts 201, conductor 211, finder 292, line circuit 291, conductor 294, station 290, conductor 295, line circuit 291, finder 292, conductor 212, contacts 203 and 218 through the upper winding of R220 to ground. As will be described below, the contacts of relays R220, R225, R240, R250, R335 and R510 will be in their operated positions, the vertical off normal contacts 313 will be operated and the normal post springs 314 unoperated at the end of a third digit which determines that the call is to the main office; and busy tone will be extended to the calling subscriber at the end of said third digit by way of conductor 248, contacts 241, conductor 368, contacts 337, conductor 367, contacts 352, conductor 366, contacts 314, 326 and 313 and thence to the calling subscriber over a path similar to that described above for a second digit which determines that a call is to the main office.

It is apparent that, if all trunks to the main office are busy when selector repeater 299 and lineswitch 500 are seized, dial tone must be returned to the calling subscriber locally rather than being returned from the main office as described above. The tone is extended from equipment (not shown) over conductor 249, contacts 251, conductor 366, contacts 336, conductor 541 and thence to the calling subscriber over the busy tone path described above for a second digit which determines that a call is to the main office.

It will now be assumed that the calling subscriber at station 290 has been connected to the selector repeater 299 and to the main office 573 by way of lineswitch 500 and trunk circuit 570 in the manner described above. Relays R220, R225, R240 and R260 in the selector repeater 299 and relays R510 and R520 in the lineswitch 500 are operated. Dial tone has been extended to station 290, and the calling subscriber dials the first digit.

*Establishing local connections in response to a first digit—left normal post springs operate*

Assume that the subscriber dials 0 to get the operator. The line relay R220 restores then energizes in response to each impulse. Slow release relay R300 is operated by the first restoration of R220 over a circuit comprising contacts 210, 223 and 247 and conductor 382; and, being slow to release, R300 is maintained operated until the end of the digit. The vertical magnet M280 is operated in response to each restoration of R220 over a circuit comprising contacts 210, 223, 247 and 263, said magnet raising the wipers 390—393 to a position opposite to the contacts in the tenth level of the bank, in which position the left normal post springs operate to close contacts 394 and 395. When the wipers are raised vertically, the vertical off normal springs 281 close to operate the slave relay R250. At contacts 251, R250 opens the operating circuit of the changeover relay R260; however, R260 is maintained operated over a locking circuit including contacts 262, conductor 378, contacts 305, conductor 377 and contacts 229 until R300 restores at the end of the digit to open contacts 305.

At contacts 221, relay R220 repeats the impulses to the main office 573 by way of line switch 500; at contacts 302, relay R300 short circuits the right hand winding of relay R215 to improve pulsing to the main office.

The impulses repeated to the main office selectively operate switching equipment (not shown) therein in a manner well known in the art to extend various connections.

When the slow release relay R300 restores at the end of the first digit, it opens contacts 305 in the locking circuit of the changeover relay R260 and closes contacts 304 to partially operate relay R315 over a circuit extending from ground over contacts 229, conductor 377, contacts 304, 321, 347 and 340, contacts 394 of the operated left normal post springs, conductor 375, the upper winding of R260, conductor 376, the lower winding of R315, contacts 320, conductor 380 and through the winding of the release magnet M286 to battery. This latter circuit also delays the restoration of R260.

Contacts 318, which operate when R315 is energized over its lower winding, cause R315 to fully operate and lock itself operated over a circuit including its upper winding, contacts 318, conductor 374 and contacts 243; at contacts 317, R315 connects the switching relay R200 to the private wiper 393 by way of conductor 373, contacts 317, conductor 372, contacts 205 and conductor 371; at contacts 319, opens the circuit of the private conductor 544 to restore relays R510 and R580 thereby to release the line switch 500 and to release the seized switching equipment in the main office in a manner well known in the art; at contacts 320 and 321 opens its original operating circuit which has maintained slow release relay R260 operated; and, at contacts 323, operates the stepping relay R310 over a circuit extending from battery, through R310, contacts 323 and 330, conductor 387, contacts 257 and 282, contacts 265 of the slow release relay R260 which has not yet restored and ground on contacts 281. At contacts 311, R310 operates the rotary magnet M360 over a circuit extending from ground on contacts 229, over conductor 377 and contacts 304 and 311 to battery on the winding of M360; and, at contacts 312, extends ground from contacts 210, over conductor 383, contacts 312 and conductor 373 to the switching relay R200 to short circuit R200 thereby to prevent its operation. M360 steps the wipers 390—393 to the first contacts in the 0 level. When the change-over relay R260 completely restores, it restores R310 at contacts 365; and, at contacts 311 and 312 respectively, R310 restores the magnet M360 and removes the short circuit from the switching relay R200. At contacts 266 and 361, R260 and M360 connect the stepping relay R310 to the private wiper 393 in parallel with the switching relay R200 over a circuit extending from the winding of R310, contacts 323 and 330, conductor 387, contacts 257, 282 and 266, conductor 385, contacts 361, contacts 317, conductor 372, contacts 205 and conductor 371 to wiper 393.

Connections to the main office have been released and the selector repeater 299 is now ready to search for and seize an idle line to the operator position (not shown) in the 0 level. Selector repeater 299 searches for absence of ground in a manner well known in the art, ground potential being connected only to the private contacts—accessible to private wiper 393—of lines that are busy.

If wiper 393 encounters ground potential on the private contact of the first line in the 0 level, indicating that said line is busy, the stepping relay R310 is operated by way of wiper 393 over the above-mentioned circuit to re-operate the rotary magnet M360 over its above-mentioned circuit. M360 steps the wipers 390—393 to the contacts of the next accessible line and restores R310 at contacts 361. R310 opens contacts 311 to restore M360. This cycle of operation is repeated until an idle line is found or until the wipers 390—393 are stepped to the eleventh rotary position, in which position busy tone is returned to the calling subscriber by way of conductor 248, contacts 241, eleventh rotary cam spring contacts 285 and thence to the calling station 290 by way of calling line conductors 294 and 295, line circuit 291 and finder 292 in a manner well known in the art.

Assuming that the wiper 393 finds an idle line, the switching relay R200 operates in series with the stepping relay R310 over a circuit extending from ground, over contacts 243, R200, conductor 373, contacts 361, conductor 385, contacts 266, 282 and 257, conductor 387, and contacts 330 and 323 to battery on the winding of R310. The stepping relay R310 does not operate in this circuit due to the high resistance winding of the switching relay R200.

At contacts 202 and 204, relay R200 extends connections from the calling line to the line wipers 390 and 391; at contacts 206, completes a path for returning the holding ground potential from the operator position in a manner well known in the art for holding R200 and R315 operated; at contacts 202 and 203, restores the line relay R220; and, at contacts 209, restores the hold relay R240 and opens a point in the operating circuit of the release magnet M286. At contacts 242, R240 restores relay R225. At contacts 221, relay R220 restores relay R520.

Connections are now established to the operator position, and any further connections will be established in a manner well known in the art.

When the calling subscriber abandons or terminates the call, he will replace the handset to open the calling line circuit which, in a manner well known in the art, controls equipment seized by way of wipers 390, 391 and 393 to remove the holding ground potential from the private contact accessible to wiper 393. Removal of ground potential from said contact will cause the line circuit 291 and finder 292 to restore to normal and will also restore relays R200 and R315. R200 operates the release magnet M286 over a circuit extending from ground, over contacts 210, 223, 246 and 283 to battery on the winding of M286. The release magnet M286 restores the wipers 390—393 to their normal position, in which position the vertical off normal contacts 283 and 281 open to restore M286 and R250. The selector repeater 299 is now in its normal restored condition and can be seized for completing another call.

It will be understood that, although the preferred embodiment shows only one level utilized for single digit switching as described above other levels can be similarly arranged.

*Use of switch 299 as a repeater determined by the second digit—wiper 392 engages a bank contact having resistance ground connected thereto*

Assume now that the subscriber at station 290 dials a first digit 3 after his station has been connected to the selector repeater 299 and to the main office 573 all in a manner previously described. As described above, relays R220, R225, R240 and R260 in the selector repeater 299 and relays R510 and R520 in the line switch 500 will have been operated incident to the seizure of the selector repeater 299.

In a manner described above, the impulses will be repeated to the main exchange 573 to selectively operate switching equipment therein; R300 will operate; and the vertical magnet M280 will raise the wipers 390—393 to a position before the third level in the contact bank. The slave relay R250 operates as described above when the wipers are raised off the vertical normal position. Relays R260 and R300 restore at the end of the digit; but, because the left normal post spring contacts 394 do not operate, relay R315 cannot operate, nor can the stepping relay R310 operate. The rotary stepping of the wipers is thereby prevented. However, a circuit for operating the rotary magnet M360 in response to a second digit is prepared.

When the second digit, for example 7, is received, relays R220, R225, R240 and R250 of the selector repeater 299 as well as relays R510 and R520 are in their operated positions. The first impulse of said second digit restores then reoperates the line relay R220. At contacts R223, R220 operates relay R300 over a circuit extending from ground over contacts 310, 223 and 247 and conductor 382 to battery on R300 and also operates the rotary magnet M360 over a circuit extending from ground over contacts 210, 223, 247 and 264, conductor 381 and contacts 344 and 322 to battery on M360. Slow release relay R300 will be held operated during the succeeding six impulses and M360 will be operated in response to each impulse to move the wipers 390—393 to the seventh rotary position in the third level of the contact bank. At contacts 303, R300 has opened the circuit for the marginal relay R355 so that the potential markings on the extra control contacts are of no effect until R300 restores at the end of the second digit, at which time the wipers 390—393 have been stepped to the desired position in the contact bank, in this case the seventh rotary position in the third level.

When R300 restores at the end of said second digit, it closes contacts 303 to connect the marginal relay R355 to resistance ground on contact 2 by way of contacts 338, 316 and 303 and wiper 392. Relay R355 operates only contacts 359 when so connected to resistance ground. Relay R345 is partially energized over an obvious circuit including contacts 359, whereby only contacts 350 are operated; R345 then operates fully over a circuit extending from battery, over the lower winding of R345, contacts 350, conductor 386 and contacts 281. At contacts 347, R345 prevents the operation of relay R315 in the event that the right normal post spring contacts 399 are operated and conductors 396 and 397 are connected when relay R335 operates, and at contacts 348, R345 partially operates relay R335 over a circuit extending from ground, over contacts 229, conductor 377, contacts 304, 321 and 348, the lower winding of R335, contacts 343, and conductor 380, through the winding of the release magnet M286 to battery. M286 does not operate in series with R335 nor in series with the resistance 388 to which M286 is also connected by way of conductor 380, contacts 320, conductor 379, contacts 254, conductor 384 and contacts 349 and 358. Relay R335, when energized over its lower winding, operates only contacts 342 which contacts operate R335 fully over a circuit extending from ground, over contacts 229, conductor 377 and contacts 342 to battery on the upper winding of R335. At contacts 338, R335 restores relay R355; at contacts 343, opens its original operating circuit; and, at contacts 344, prevents the operation of the rotary magnet M360 in response to succeeding digits dialed by the calling subscriber.

The second digit 7 is also repeated to the main exchange 573 to selectively operate switching equipment therein in a manner described above. The selector repeater 299 is now in a condition whereby local switching cannot be effected, and also it is ready to receive a third series of impulses. The third and all subsequent series of impulses will cause connections to be made by way of the main office 573 in a manner well known in the art. When the call is answered, battery connections on the line conductors will be reversed in a manner well known in the art. This will cause the windings of the shunt field relay R215 to be energized so that their fields oppose to operate the contacts of R215 for purposes well known in the art, e. g. metering.

It will be noted that the extra control contacts in all levels except the 0 level have been wired. However, if all of the subscribers that can be reached by the subscribers in the suboffice and by way of the main office have directory numbers with the same first digit, 3, then it is apparent that only the third level of the selector repeater 299 need be wired. The marginal relay R355 may be one of many relays well known in the art which will properly function to close only contacts 359 over a considerable variation in power supplied thereto. It is not unusual that, if three such relays were simultaneously connected to the resistance potential normally used to operate only one relay, they will still operate properly. This permits multipling the banks of the selector repeaters.

*Use as a repeater determined by the third digit—wiper 392 encounters ground to restore switch after second digit. Right normal post springs do not operate when third digit is received*

Assume that the calling subscriber at station 290 has been connected to the main office 573 and to the selector repeater 299, that the wipers of the selector repeater have been raised to the third level in response to a first digit 3 and that the subscriber now dials a second digit 6, relays R510, R520, R220, R225, R240 and R250 being in their operated positions, all in a manner described above.

In response to said second digit 6, relay R300 and the rotary magnet M360 are operated over circuits described above, M360 stepping the wipers 390—393 to the sixth rotary position of the third level, in which position wiper 392 encounters ground potential. When relay R300 restores at the end of said second digit, it closes contacts 303 to fully operate relay R355 over a circuit extending from ground on contact 401, wiper 392 and contacts 303, 316 and 338 to battery on R355.

At contacts 356, R355 completes an obvious circuit for fully operating relay R345. At contacts 350, relay R345 locks itself operated over a previously described circuit; and, at contacts 349, extends ground potential from contacts 356, over contacts 349, conductor 384, contacts 254, conductor 379, contacts 320 and conductor 380 to the release magnet M286, thereby to operate M286 and to short circuit the lower winding of relay R335, whereby the operation of R335 over a circuit previously described is prevented.

The release magnet M286 operates to restore the wipers 390—393 to normal, relays R250 and R355 restoring. At contacts 253, R250 reoperates the changeover relay R260; and, at contacts 254, removes the short circuit from the lower winding of relay R335 and restores the release magnet M286. Relay R345 is held operated (until the release magnet M286 restores) over a circuit extending from battery through the upper winding of R345, contacts 349, conductor 384, contacts 287 of the release magnet to ground on contacts 229. Before relay R345 restores, relay R335 is operated in series with the release magnet M286 over a circuit previously described; M286 as described above will not operate over this circuit, but is maintained operated over the circuit. However, when R335 operates, it opens said circuit at contacts 343 to restore M286. R345 restores in response to the restoration of M286.

The switching selector repeater 299 is now prepared for the receipt of the third digit, which digit we will assume to be 0. Relays R220, R225, R240, R260, R335, R510 and R520 are operated at this time.

In response to said third digit 0, ten impulses are repeated to the main office 573 and the wipers 390—393 are stepped to the tenth level by the vertical magnet M280. In said tenth level, contacts 399 of the right normal post springs are not operated. With relay R335 operated, right normal post springs 399 not operated and the wipers of the switch in a vertical off normal position, that part of the switching selector repeater 299, which provides for switching through local connections, is rendered ineffective; and all digits thereafter received by selector repeater 299 will be repeated to the main office 573 in a manner described above to establish a connection by way of said main office.

It is apparent that connections may be completed by way of the main office 573 in response to any third digit except those which establish local connections.

*Operation as a selector determined by the third digit—switch through in response to said third digit*

Assume that the calling subscriber at station 290 has been connected to the main office 573 and to the selector repeater 299, that the subscriber has dialed the first two digits 36, that said digits have been repeated to the main office 573 and that the selector repeater 299 has been operated and restored to normal all in a manner described in the preceding section. Relays R220, R225, R240, R260 R345, R510 and R520 are operated and the selector repeater 299 is prepared to receive the third digit which we will assume to be 2. It will further be assumed that conductor 397 is connected to conductor 396 and that conductor 398 is not connected to conductor 396.

In response to said third digit 2, the line relay R220 operates relay R300 and operates the vertical magnet M280 to cause the wipers 390—393 to be stepped to the second vertical level all in a manner described above. The contacts 399 of the right normal post springs are operated by the shaft of selector 299 when the wipers 390—393 are in the second vertical level. As described above, the vertical off normal contacts 281 and slave relay R250 are operated, and at the end of said third digit relay R300 restores. At contacts 304, R300 partially operates relay R315 over a circuit extending from battery on the release magnet M286 over conductor 380, contacts 320, the lower winding of R315, conductor 376, the upper winding of R260, conductors 375, 397 and 396, contacts 399 of the right normal post springs, contacts 341 of relay R335, contacts 347, 321 and 304 and conductor 377 to ground at contacts 229. As described above, relay R315 operates fully, connects the switching relay R200 to wiper 393, locks itself operated, releases connections to the main office 573, opens its operating circuit to restore relay R260, and operates the stepping relay R310. Also as described above, the stepping relay R310 operates the rotary magnet M360 once to step the wipers 390—393 to the first rotary position in the second level of the contact bank; when R260 restores after a short delay, the stepping relay R310 is restored as well as the rotary magnet M360 and the stepping relay R310 is connected to the private wiper R393 in parallel with a switching relay R200 in a manner described above. The selector repeater 299 will in a manner described above search for an idle outlet in said second level and switch through connections thereto.

It is apparent that any one or more of the levels 1–9 of the selector repeater 299 may be utilized for extending local connections in response to certain subscriber numbers having first and second digits 3 and 6 respectively.

*Operation as a selector determined by third digit—switch through in response to the fourth digit*

Assume that the subscriber at station 290 has been connected to the main exchange 573 and to the switching selector repeater 299, that said subscriber has dialed the digits 3 and 6, that said digits have been repeated to the main office 573 to selectively operate switching equipment therein, that the switch 299 has been operated in response to said two digits and restored to normal all in a manner described above. Assume further that conductor 398 is connected to conductor 396 and that conductor 397 is not connected to conductor 396. Relays R220, R225, R240, R260, R335, R510 and R520 are operated at this time, and a selector repeater 299 is now ready to receive a third digit which we will again assume to be digit 2.

In the manner described in the preceding section, the receipt of said third digit 2 will cause the wipers to be stepped to the second vertical level in which level contacts 399 are operated and relays R250 and R300 will be operated. At the end of said third digit relays R260 and R300 are restored; and at contacts 304, R300 will operate relay R325 over the circuit extending from ground over contacts 229, conductor 377, contacts 304, 321, 347 and 341, contacts 399 of the right normal post springs, conductors 396 and 398 and through the upper winding of R325 to battery; at contacts 329, R325 locks itself operated over a circuit including conductor 386 and vertical off normal contacts 381; at contacts 327, prepares a circuit for operating relay R315; and, at contacts 328, short circuits the lower winding of R315 and operates the release magnet M286 by extending the ground potential which operated R325 over contacts 328, conductor 384, contacts 254 and 320, conductor 380 through the release magnet M286 to battery. The release magnet M286 restores the wipers 390—393 to normal; relay R250 restores to remove the short circuit from the lower winding of R315 to permit R315 to partially operate over a circuit extending from ground over contacts 229, conductor 377, contacts 327, the lower winding of R315, contacts 320, conductor 380 through the release magnet M286 to battery; relay R250 also reoperates the changeover relay R260; the vertical off normal contacts 281 open to open one holding circuit of relay R325; however R325 is held operated over a circuit including its upper winding, contacts 328, conductor 384, contacts 287 of the release magnet M286 and ground on contacts 229. Relay R315, as described above, operates fully, connects the switching relay R220 to the private wiper 393, locks itself operated over its upper winding, releases connections to the main office 573, opens its original operating circuit to restore the release magnet M286, and prepares a circuit for operating the stepping relay 310. When the release magnet M286 restores, it opens contacts 287 to restore relay R325.

The selector repeater 299 is now ready to receive a fourth digit, which we will assume to be the digit 2, relays R220, R225, R240, R260, R315 and R335 being operated.

The line relay R220 will be restored and reoperated twice in response to said fourth digit 2 to operate relay R300 and to cause the vertical magnet M280 to raise the wipers 390—393 to the second level in a manner previously described. When the vertical off normal spring contacts 281 close, slave relay R250 then stepping relay R310 operate over circuits previously described. When at the end of said fourth digit, relay R300 restores, the holding circuit for R260 is opened and the rotary magnet M360 is energized to rotate the wipers 390—393 to the first bank contacts in the second level and to restore the stepping relay R310. When the changeover relay R260 restores, the wipers will be rotated to an idle outlet in a manner previously described under the control of the stepping relay R310, the switching relay R200 and the rotary magnet M360.

Attention is directed to the fact that the wipers will be raised then rotated in response to any fourth digit after a third digit restoration of the selector repeater 299 as described in this section. The tenth level is connected to the operator position; and, therefore, the numeral 0 cannot be utilized as the fourth digit of a local number as described in this section. Accordingly, the applicant herein has provided means for forcing the wipers to the eleventh rotary position to give a busy signal in case that a local subscriber accidentally dials a fourth digit 0. In such an event, the wipers will be raised to the tenth level, in which position the left normal post springs operate to close contacts 395. This extends ground potential from contacts 243, over conductor 374, contacts 339, 395 and 317, conductor 372, contacts 205 and conductor 371 to the private wiper 393, to continuously short circuit the switch relay R200 and to cyclically operate the stepping relay R310 and the rotary magnet M360 until the wipers are rotated to the eleventh rotary position in the tenth level. The cam springs then operate to prevent the reoperation of the stepping relay R310 at contacts 282 and to complete at contacts 284 a previously described circuit for extending busy tone to the calling subscriber.

While there has been described what is at present believed to be the preferred embodiment of the invention, it will be understood that various modifications may be made therein; and, it is contemplated to cover in the appended claims all such modifications as fall within the true spirit and the scope of the invention.

What is claimed is:

1. For use in a telephone system having a main office and a suboffice together with means including a group of switching selector repeaters in said suboffice for completing connections between lines of calling subscribers in said subboffice and lines of called subscribers in said suboffice and in the main office, each selector repeater having a wiper set, including a special wiper, with a plurality of primary and secondary positions, bank contacts in the selector repeaters accessible to the wipers, certain of the contacts accessible to the special wiper having various electric potentials connected thereto, those bank contacts accessible to the special wiper in each switch and in all switches, having the same potential connected thereto, being multipled to each other, means operated in response to the initiation of a call by one of said calling subscribers for extending his line to one of said selector repeaters and to the main office by way of said one selector repeater; means in said one selector repeater operated responsive to a first and a second series of impulses for repeating said impulses to the main office and for moving the wipers to a primary position thereof and then to a secondary position thereof, means in said one selector repeater operated responsive to its special wiper encountering a certain one of said potentials connected to the bank contact accessible thereto in said secondary position for restoring the wipers to normal, control means independent of said bank contacts and operated only in certain of the primary positions of the wipers, said third-mentioned means operated responsive to a certain third series of impulses for repeating said third series of impulses to the main exchange and for moving the wipers into one of said certain primary positions thereof, thereby to operate said control means, and means in said one selector repeater operated responsive to said operation of the control means for moving the wipers to a desired secondary position, for extending connections to the wiper set and for disconnecting the calling line from the main office.

2. The combination claimed in claim 1 wherein said third-mentioned means is operated responsive to a certain other third series of impulses for repeating said other impulses to the main exchange and for moving the wiper into a primary position other than said certain primary positions, and means effective upon a failure of said control means to operate upon receipt of the third series of impulses for preventing the movement of the wipers and for preventing disconnection of the calling line from the main office, whereby connections will be established by way of the main office.

3. The combination claimed in claim 1 together with means operated responsive to the special wiper engaging in said first-mentioned secondary position a bank contact having a different one of said potentials for rendering the wipers ineffective, and for preventing disconnection of the calling line from the main office, whereby connections will be established by way of the main office.

4. The combination claimed in claim 1 together with a second control means independent of said bank contacts and operated in a primary position of the wipers other than said certain primary positions, and means operated responsive to the operation of said second control means consequent to the movement of the wipers into said other primary position by the first series of impulses for moving the wipers to a desired secondary position, for extending connections to the wiper set and for disconnecting the calling line from the main office.

5. The combination claimed in claim 4 wherein the first-mentioned control means includes contacts operated by one set of normal post springs and wherein said second control means includes contacts operated by another set of normal post springs.

6. For use in a telephone system having a main office and a suboffice together with means including a group of switching selector repeaters in said suboffice for completing connections between lines of calling subscribers in said suboffice and lines of called subscribers in said suboffice and in the main office, each selector repeater having a wiper set, including a special wiper, with a plurality of primary and secondary positions, bank contacts in the selector repeaters accessible to the wipers, certain of the contacts accessible to the special wiper having various electric potentials connected thereto, those bank contacts accessible to the special wiper in each switch and in all switches, having the same potential connected thereto, being multipled to each other; means operated in response to the initiation of a call by one of said calling subscribers for extending his line to one of said selector repeaters and to the main office by way of said one selector repeater, means in said one selector repeater operated responsive to a first and a second series of impulses for repeating said impulses to the main office and for moving the wipers to a primary position thereof and then to a secondary position thereof, means in said one selector repeater operated responsive to its special wiper encountering a certain one of said potentials connected to the bank contact accessible thereto in said secondary position for restoring the wipers to normal, control means independent of said bank contacts and operated only in certain of the primary positions of the wipers, said third-mentioned means operated responsive to a certain third series of impulses for repeating said third series of impulses to the main exchange and for moving the wipers into one of said certain primary positions thereof, thereby to operate said control means, means controlled by said operation of the control means for again restoring the wipers to normal, said third means operated in response to a fourth series of impulses for moving the wipers to a desired primary position and then to a desired secondary position, and means for extending connections to the wipers and for disconnecting the calling line from the main office.

7. The combination claimed in claim 6 wherein said third-mentioned means is operated responsive to a certain other third series of impulses for repeating said other impulses to the main exchange and for moving the wiper into a primary position other than said certain primary positions, and means effective upon a failure of said control means to operate upon receipt of the third series of impulses for preventing the movement of the wipers and for preventing disconnection of the calling line from the main office, whereby connections will be established by way of the main office.

8. The combination claimed in claim 6 together with means operated responsive to the special wiper engaging in said first-mentioned secondary position a bank contact having a different one of said potentials for rendering the wipers ineffective, and for preventing disconnection of the calling line from the main office, whereby connections will be established by way of the main office.

9. The combination claimed in claim 6 together with a second control means independent of said bank contacts and operated in a primary position of the wipers other than said certain primary positions, and means operated responsive to the operation of said second control means consequent to the movement of the wipers into said other primary position by the first series of impulses for moving the wipers to a desired secondary position, for extending connections to the wiper set and for disconnecting the calling line from the main office.

10. The combination claimed in claim 9 wherein the first-mentioned control means includes contacts operated by one set of normal post springs and wherein said second control means includes contacts operated by another set of normal post springs.

11. The combination claimed in claim 9 together with other contacts operated by said other normal post springs consequent to the movement of the wipers into said other primary position by the fourth series of impulses for forcing the wipers to a position in which a busy signal is returned to the calling subscriber.

No references cited.